USO10753230B2

United States Patent
Manteiga et al.

(10) Patent No.: US 10,753,230 B2
(45) Date of Patent: Aug. 25, 2020

(54) GAS TURBINE ENGINE COOLING AIR MANIFOLDS WITH SPOOLIES

(71) Applicant: General Electric Company, Schenectady, NY (US)

(72) Inventors: John Alan Manteiga, North Andover, MA (US); Sydney Michelle Wright, Cincinnati, OH (US); Christopher Richard Koss, West Chester, OH (US); Tod Kenneth Bosel, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 47 days.

(21) Appl. No.: 16/190,859

(22) Filed: Nov. 14, 2018

(65) Prior Publication Data

US 2019/0078464 A1 Mar. 14, 2019

Related U.S. Application Data

(63) Continuation of application No. 14/836,985, filed on Aug. 27, 2015, now Pat. No. 10,378,379.

(51) Int. Cl.
*F01D 25/12* (2006.01)
*F01D 9/06* (2006.01)
(Continued)

(52) U.S. Cl.
CPC ............... *F01D 25/12* (2013.01); *F01D 9/02* (2013.01); *F01D 9/06* (2013.01); *F01D 17/105* (2013.01);
(Continued)

(58) Field of Classification Search
CPC .......... F01D 25/12; F01D 25/24; F01D 25/08; F01D 17/105; F01D 19/00; F01D 9/02;
(Continued)

(56) References Cited

U.S. PATENT DOCUMENTS

| 5,273,397 A | 12/1993 | Czachor et al. |
| 5,584,511 A | 12/1996 | Gonzalez et al. |

(Continued)

FOREIGN PATENT DOCUMENTS

CN 101675227 A 3/2010

OTHER PUBLICATIONS

European Search Report and Opinion issued in connection with corresponding EP Application No. 16185253.8 dated Jan. 26, 2017.
(Continued)

*Primary Examiner* — Mark A Laurenzi
*Assistant Examiner* — Mickey H France
(74) *Attorney, Agent, or Firm* — McGarry Bair PC

(57) ABSTRACT

A spoolie manifold including two or more spaced apart caps including outlets and one pair of caps connected together in flow communication by a jumper tube assembly. Jumper tube assembly including a jumper tube having first and second spoolies attached to opposite ends of the jumper tube. Ends may be welded into counterbores of the spoolies having spherical spoolie ends press-fitted into first and second sleeves in bores in pair of the caps and sleeves retained in bores with retainer clips. A duct connected in flow communication to an inlet of one of the caps. Spoolie manifold may include three spaced apart caps including a distributor cap between two port caps connected in flow communication to distributor cap by jumper tube assembly. Cap outlets may be feed strut ports in casing of turbine frame including hub spaced inwardly from casing and having spaced apart hollow struts with strut ports.

19 Claims, 9 Drawing Sheets

(51) Int. Cl.
  *F01D 9/02* (2006.01)
  *F01D 17/10* (2006.01)
  *F01D 25/24* (2006.01)
  *F04D 19/00* (2006.01)
  *F01D 25/08* (2006.01)
  *F02C 6/08* (2006.01)

(52) U.S. Cl.
  CPC ............ *F01D 25/24* (2013.01); *F04D 19/00* (2013.01); *F01D 25/08* (2013.01); *F02C 6/08* (2013.01); *F05D 2220/32* (2013.01); *F05D 2250/241* (2013.01); *F05D 2260/20* (2013.01)

(58) Field of Classification Search
  CPC .... F01D 9/06; F05D 2260/20; F05D 2220/32; F05D 2250/241; F02C 6/08
  USPC .............................................. 416/95; 60/806
  See application file for complete search history.

(56) References Cited

U.S. PATENT DOCUMENTS

| | | |
|---|---|---|
| 5,603,531 A | 2/1997 | Maier |
| 5,738,488 A | 4/1998 | Gazzillo et al. |
| 5,765,534 A | 6/1998 | Brown et al. |
| 5,800,124 A | 9/1998 | Zelesky |
| 6,149,074 A | 11/2000 | Friedel et al. |
| 6,185,925 B1 | 2/2001 | Proctor et al. |
| 6,358,001 B1 | 3/2002 | Bosel et al. |
| 6,382,906 B1 | 5/2002 | Brassfield et al. |
| 6,397,604 B2 | 6/2002 | Eldrid et al. |
| 6,443,694 B1 | 9/2002 | Karlsson |
| 6,506,021 B1 | 1/2003 | Wilson et al. |
| 6,581,978 B2 | 6/2003 | Li |
| 7,255,536 B2 | 8/2007 | Cunha et al. |
| 8,636,471 B2 | 1/2014 | Harris, Jr. et al. |
| 2002/0136631 A1 | 9/2002 | Zearbaugh et al. |
| 2008/0112791 A1 | 5/2008 | Lee et al. |
| 2013/0227930 A1 | 9/2013 | Pegan et al. |
| 2013/0243576 A1 | 9/2013 | Tsutsumi et al. |
| 2014/0056686 A1 | 2/2014 | Zhang et al. |

OTHER PUBLICATIONS

First Office Action and Search issued in connection with corresponding CN Application No. 201610730500.X dated Sep. 27, 2017.

GAS TURBINE ENGINE COOLING AIR MANIFOLDS WITH SPOOLIES

CROSS-REFERENCE TO RELATED APPLICATIONS

This application is a continuation of and claims the benefit of U.S. application Ser. No. 14/836,985, filed Aug. 27, 2015, now U.S. Pat. No. 10,378,379, issued Aug. 13, 2020, entitled "GAS TURBINE ENGINE COOLING AIR MANIFOLDS WITH SPOOLIES" and incorporated here by reference in its entirety to provide continuity of disclosure.

BACKGROUND OF THE INVENTION

Technical Field

The present invention relate to air manifolds and, more specifically, to gas turbine engine turbine cooling air manifolds.

Background Information

Gas turbine engines include one or more rotor shafts supported by bearings which, in turn, are supported by annular frames. Frames include an annular casing spaced radially outwardly from an annular hub with a plurality of circumferentially spaced apart struts extending therebetween. The struts may be integrally formed with the casing and hub in a common casting, for example, or may be suitably bolted thereto. The bearings are supported by the frame and within the hub.

The struts are hollow so pressurized cooling air may pass through and be routed into the hub. The pressurized air may provide rotor purge for the high pressure and low pressure turbines through holes in the hub. The air also provides cooling for the strut and hub in addition to service lines and tubes contained within the struts which service an aft high pressure rotor bearing. It is important that the pressurized air within the strut and hub not be lost due to leakage. If leakage occurs, the rotor cavity temperatures will be adversely affected.

The pressurized cooling air is supplied to the struts by an air manifold system. The air manifold system typically includes three or four or more manifold assemblies including a bleed air supply pipe or duct for conveying bleed air from the compressor to a manifold which includes supply ducts leading to caps covering radially outer inlets to the hollow frame struts. State of the art manifolds are formed welded tube rigidly mounted to an engine casing. Jumper tubes with piston ring seals (or sealing) have also been used. The rigidly mounted manifolds are heavy, costly, and tend to have high cycle fatigue and fit-up problems. Jumper tubes with piston ring designs tend to have wear durability problems, reduced angular misalignment capability, and increased leakage. Thus, it is desirable to have a manifold and manifold assembly that reduces and/or eliminates these problems.

SUMMARY OF THE INVENTION

A spoolie manifold includes two or more spaced apart caps, each of the caps including an outlet, at least one pair of the caps connected together in flow communication by a jumper tube assembly, and the jumper tube assembly includes a jumper tube having first and second spoolies attached to opposite distal first and second ends respectively of the jumper tube. The first and second ends may be welded into counterbores of the first and second spoolies respectively, spherical spoolie ends of the first and second spoolies may be press-fitted into first and second sleeves in bores in first and second ones of the at least one pair of the caps respectively, and the first and second sleeves may be retained in the bores with retainer clips.

The first sleeve may be press-fitted into an outlet bore of the first one of the at least one pair of the caps and the second sleeve press-fitted into an inlet bore in the second one of the at least one pair of the caps respectively.

The first one of the at least one pair of the caps may include an inlet and a duct may be connected in flow communication to the inlet.

One embodiment of the spoolie manifold includes three spaced apart caps including a distributor cap spaced apart from and disposed between two port caps. Each of the caps includes an outlet and each of the port caps are connected in flow communication to the distributor cap by a jumper tube assembly including a jumper tube having first and second spoolies attached to opposite distal first and second ends respectively of the jumper tube. The first and second ends may be welded into counterbores of the first and second spoolies respectively, spherical spoolie ends of the second spoolies press-fitted into second sleeves in inlet bores in the port caps, spherical spoolie ends of the first spoolies press-fitted into first sleeves in outlet bores in the distributor cap, and the first and second sleeves retained in the outlet and inlet bores, with retainer clips. A duct may be connected in flow communication to an inlet of the distributor cap.

The port caps may include clockwise and counter-clockwise port caps connected in flow communication to the distributor cap by clockwise and counter-clockwise extending jumper tubes connected to clockwise and counter-clockwise outlet ports respectively of the distributor cap. The first and second spoolies are attached to each of the opposite distal first and second ends respectively of each of the clockwise and counter-clockwise jumper tubes.

A gas turbine engine assembly includes an annular outer casing circumscribing a centerline axis of the engine, a spoolie manifold including three spaced apart caps with cap outlets in fluid supply communication with corresponding ones of casing ports in the annular outer casing. The three caps include a distributor cap spaced apart from and disposed between two port caps, each of the port caps connected in flow communication to the distributor cap by a jumper tube assembly, and the jumper tube assembly including a jumper tube having first and second spoolies attached to opposite distal first and second ends respectively of the jumper tube. A high pressure compressor may be connected in fluid supply communication with the bleed duct.

The gas turbine engine assembly may further include an annular turbine frame including an annular hub spaced radially inwardly from the casing, a plurality of circumferentially spaced apart hollow struts having strut ports including the casing ports in the annular outer casing, and the struts extending radially between the casing and the hub.

BRIEF DESCRIPTION OF THE DRAWINGS

The invention, in accordance with preferred and exemplary embodiments, is more particularly described in the following detailed description taken in conjunction with the accompanying drawings in which.

DESCRIPTION

Figure 1:
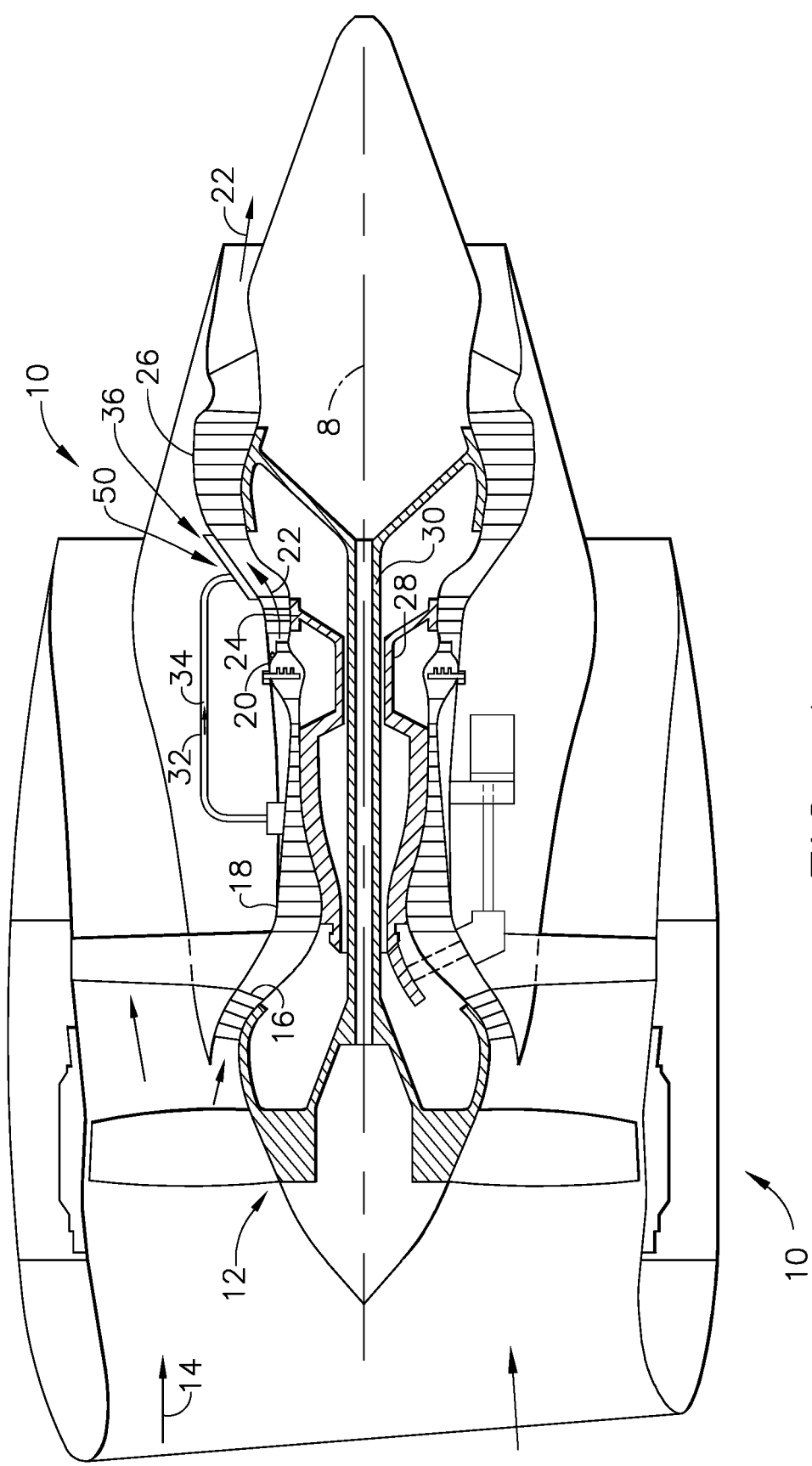
FIG. 1 is a cross-sectional illustration of an exemplary aircraft turbofan gas turbine engine including a compressor bleed air manifold assembly with spoolie manifold.

Illustrated schematically in FIG. 1 is an exemplary turbofan gas turbine engine 10 circumscribed about a centerline axis 8 of the engine 10 and including a fan 12 which receives ambient air 14, a low pressure or booster compressor 16, a high pressure compressor (HPC) 18, a combustor 20 which mixes fuel with the air 14 pressurized by the HPC 18 for generating combustion gases 22 which flow downstream through a high pressure turbine (HPT) 24, and a low pressure turbine (LPT) 26 from which the combustion gases 22 are discharged from the engine 10. A first or high pressure shaft 28 joins the HPT 24 to the HPC 18, and a second or low pressure shaft 30 joins the LPT 26 to both the fan 12 and the low pressure compressor 16. A manifold assembly 50 includes a bleed duct 32 in flow communication with the HPC 18 and is used for bleeding a portion of the compressed air therein for cooling and purging components of the engine. This bleed air 34 may also be referred to herein as cooling air.

Figure 2:
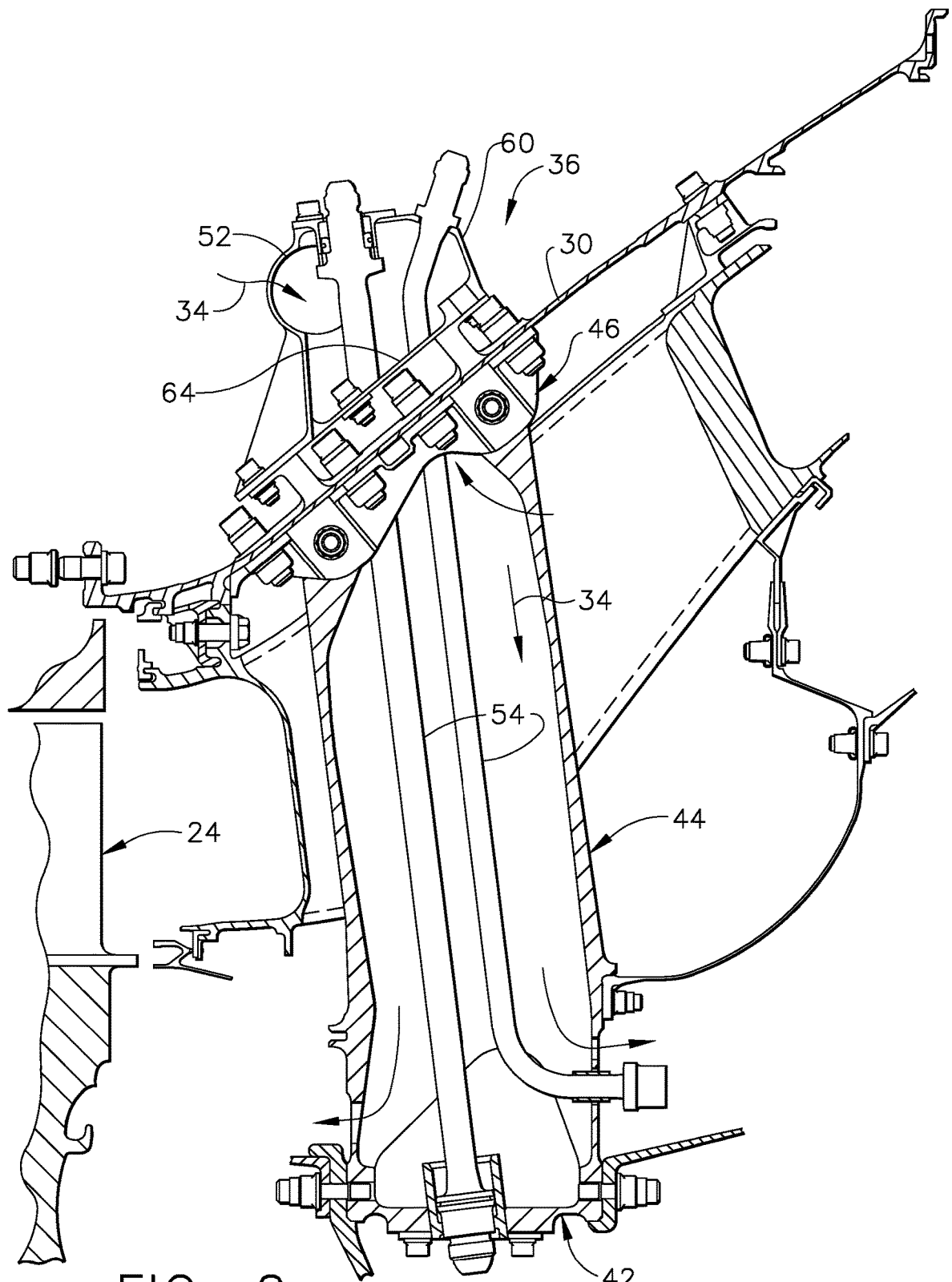
FIG. 2 is a cross-sectional illustration of a hollow strut fed by the spoolie manifold illustrated in FIG. 1.

Referring to FIGS. 1-2, the bleed air 34 is ducted by the manifold assembly 50 to an annular turbine center frame 36 between the HPT 24 and the LPT 26. The turbine frame 36 includes an annular outer casing 38 circumscribed about the centerline axis 8 of the engine 10. The frame 36 also includes an annular hub 42 spaced radially inwardly from the casing 38 and a plurality of circumferentially spaced apart hollow struts 44 extending radially between the casing 38 and the hub 42 and joined thereto.

Figure 3:
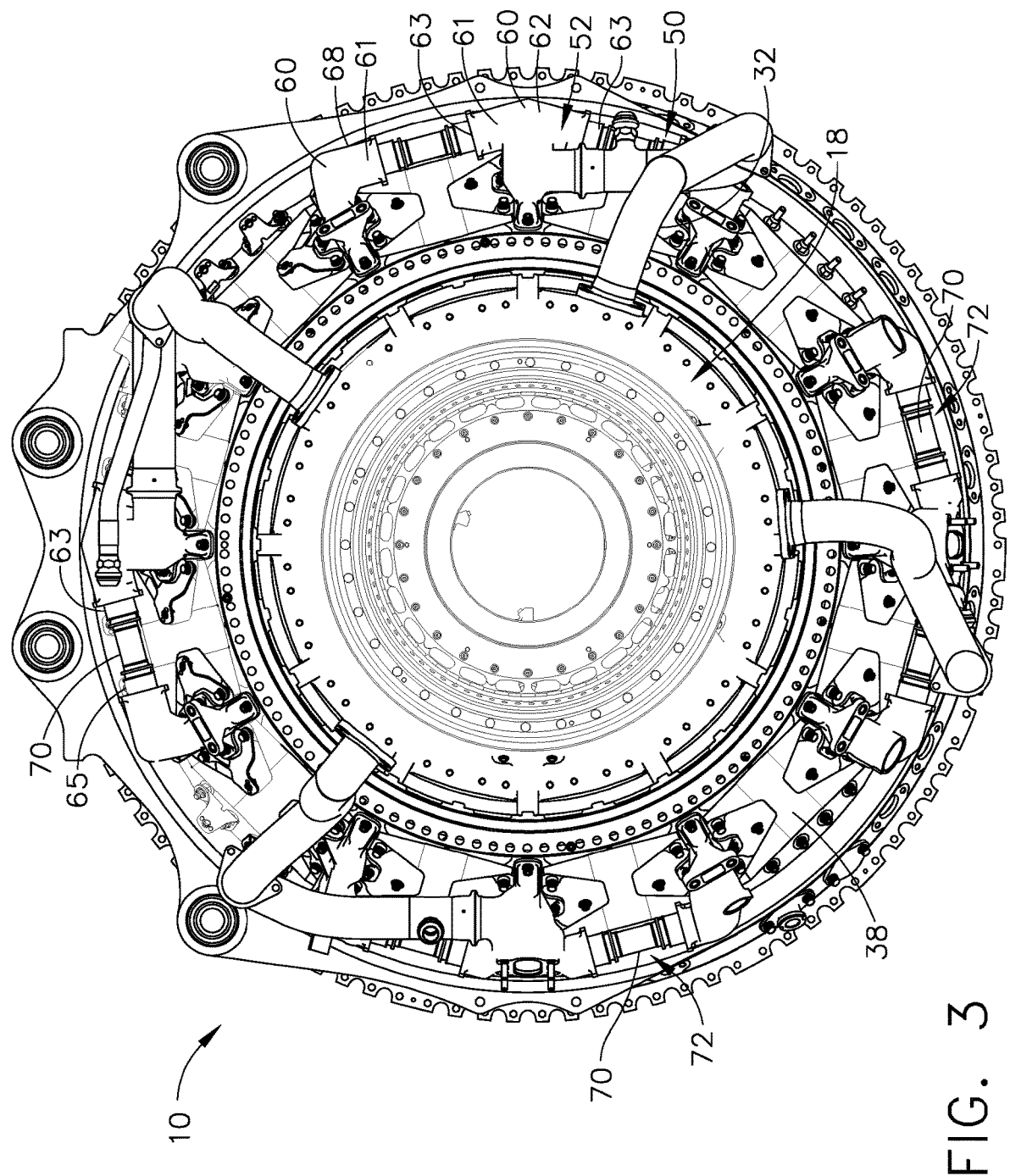
FIG. 3 is a forward looking aft axial view illustration of the manifold assemblies illustrated in FIG. 1.
Figure 4:
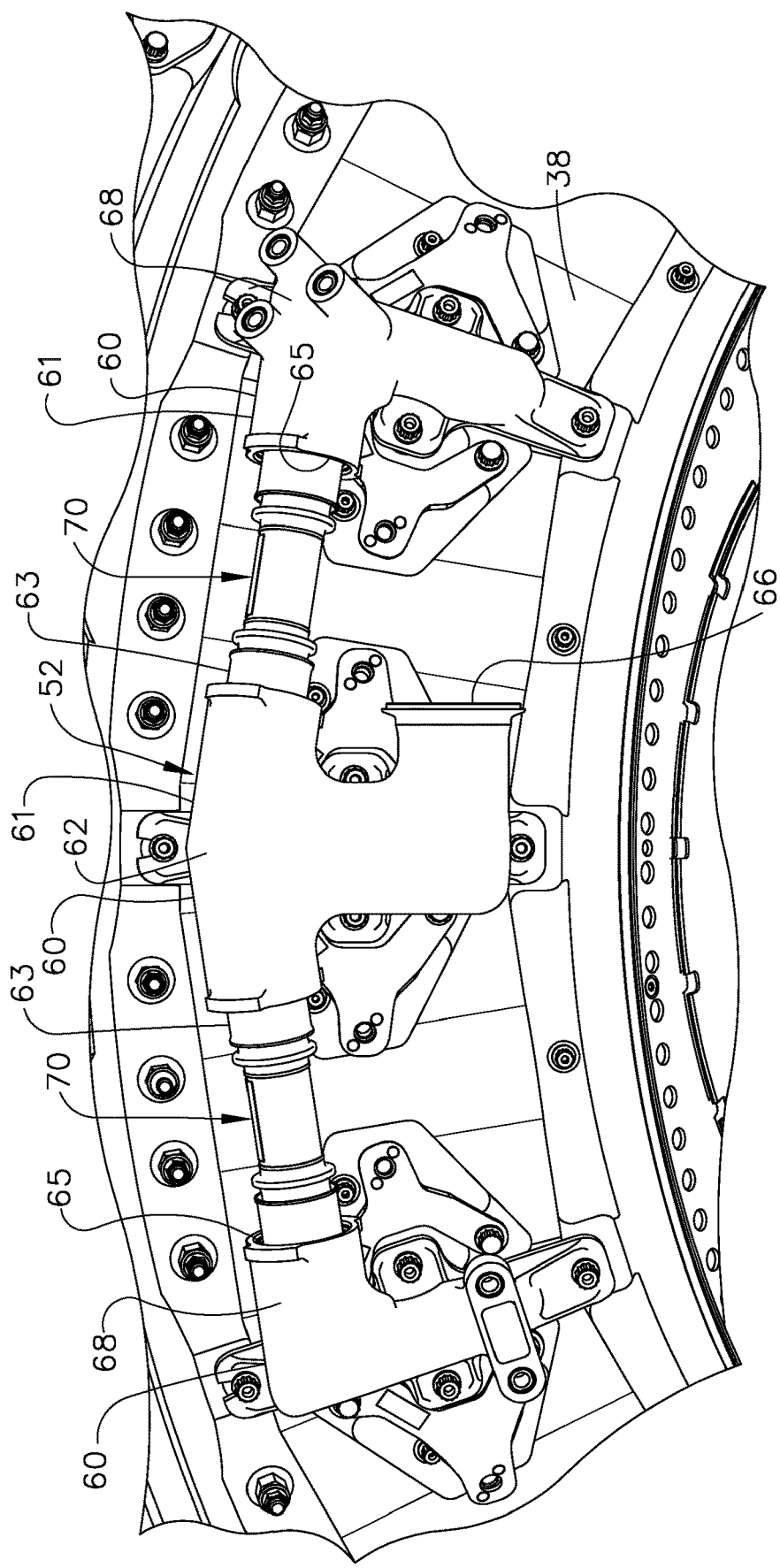
FIG. 4 is a perspective view illustration of one of the spoolie manifolds illustrated in FIG.

Referring to FIGS. 2-4, the radially outer end of each strut 44 is suitably bolted to a support pad 46, which in turn, is suitably bolted to the casing 38 and in flow communication with a respective casing or strut port 48 therein. Each of the strut ports 48 is in flow communication with the bleed duct 32 by way of a spoolie manifold 52 of the manifold assembly 50. The cooling air 34 is channeled from the spoolie manifold 52 through linearly or circumferentially spaced apart caps 60 of the spoolie manifold 52 mounted to the casing 38 and into the strut port 48 and radially downwardly through the struts 44 and exits through the hub 42. The struts 44 may also include conventional service pipes 54 which carry and return lubrication oil to the center region of the engine 10 as is conventionally known.

Figure 5:
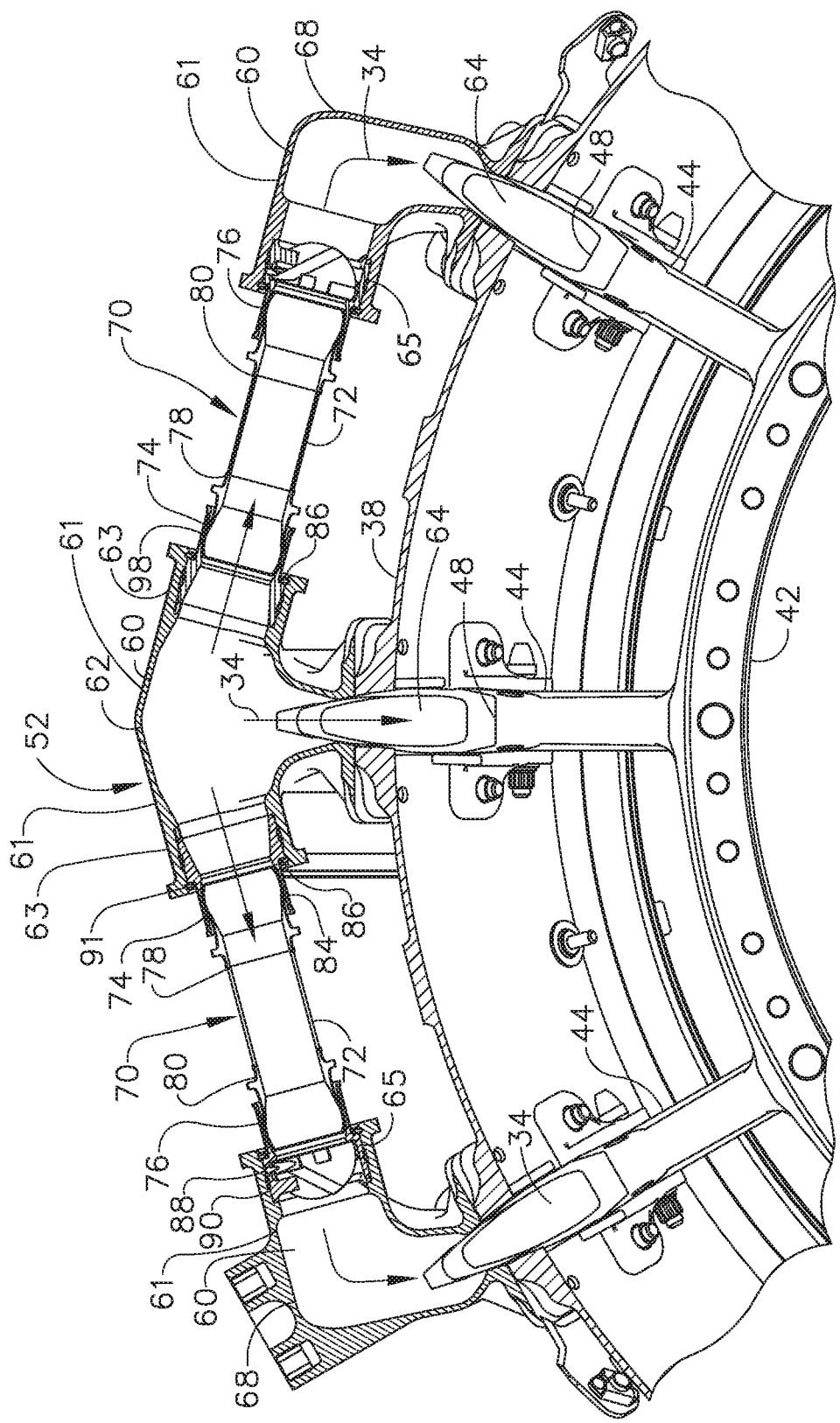
FIG. 5 is a partially cut-away perspective view illustration of the spoolie manifold illustrated in FIG. 4.

Referring to FIGS. 3-5, the spoolie manifold 52 includes a distributor cap 62 which is one of the caps 60 with an inlet 66 connected to the bleed duct 32 which leads to a stage of the compressor such as the fourth stage. Each of the caps 60 include an outlet 64 through which bleed air 34 from the bleed duct 32 is supplied to, distributed to, or flowed into the strut port 48 and through the strut 44 over which the cap 60 is bolted. Adjacent pairs 61 of the caps 60 are connected in fluid communication by jumper tube assemblies 70. The caps 60 may also include one or more port caps 68 of the spoolie manifold 52. The port caps 68 are connected to the distributor cap 62 by the jumper tube assemblies 70. The distributor cap 62 includes cap outlet ports 63 to which the jumper tube assemblies 70 are connected. The port caps 68 includes cap inlet ports 65 to which the jumper tube assemblies 70 are connected.

Figure 6:
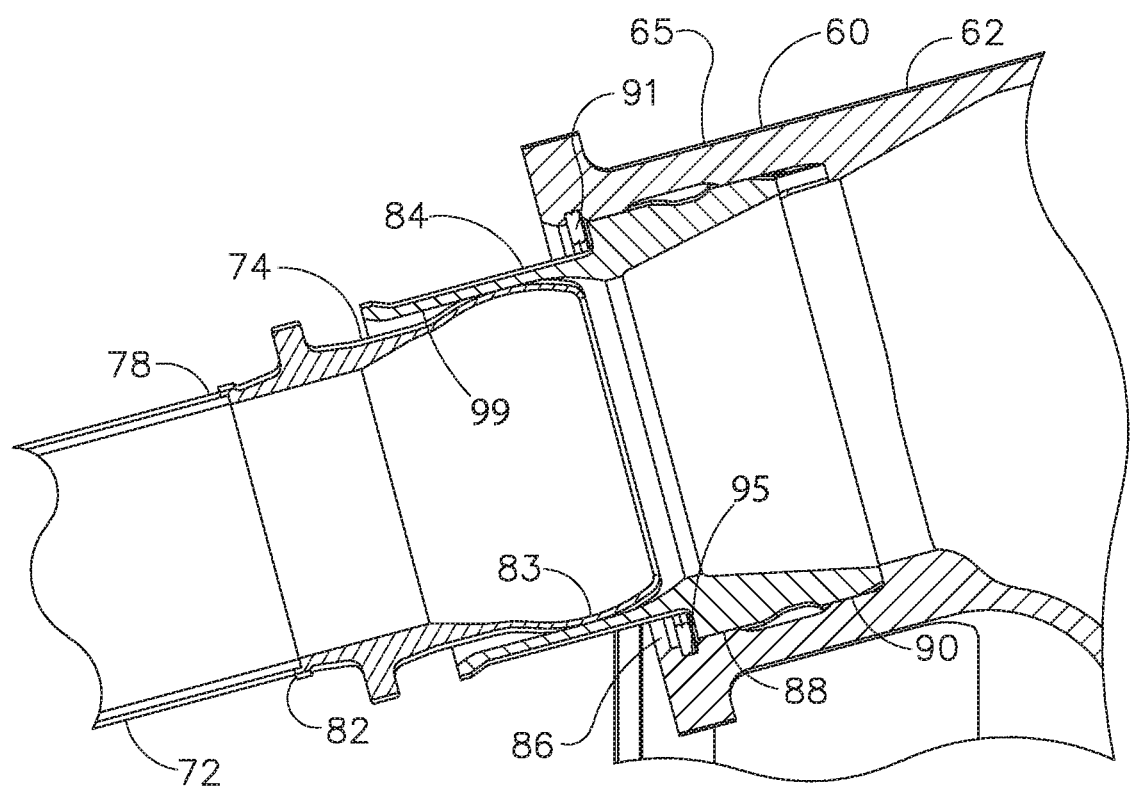
FIG. 6 is a cut-away perspective view illustration of a spoolie illustrated in FIG. 5.
Figure 7:
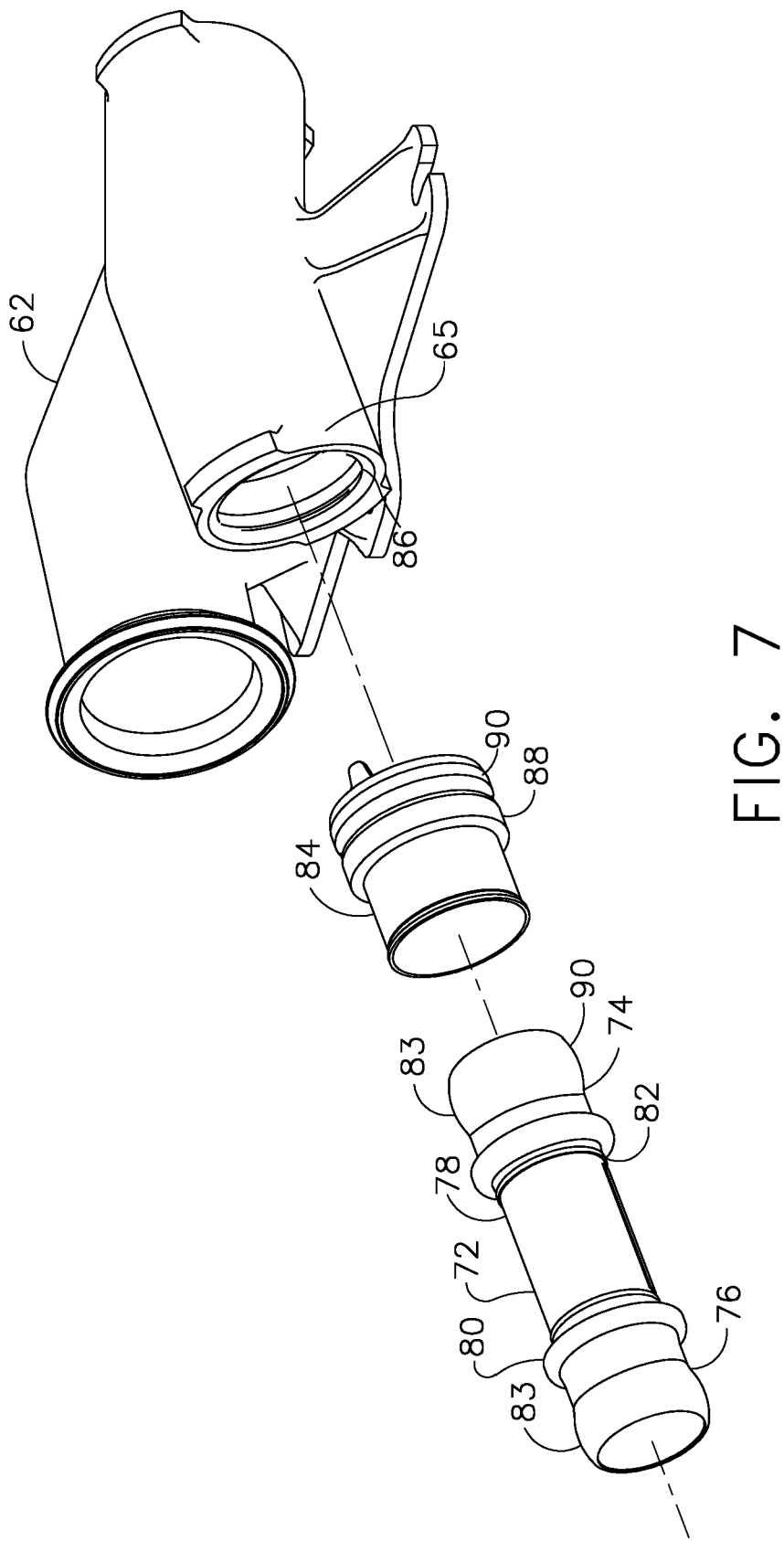
FIG. 7 is an exploded view illustration of the spoolie, jumper tube, and a distributor cap of the spoolie manifold illustrated in FIG. 5.

Referring to FIGS. 5-7, each of the jumper tube assemblies 70 includes a hollow and empty jumper tube 72 having first and second spoolies 74, 76 attached to each of opposite distal first and second ends 78, 80 respectively of the jumper tube 72. Illustrated in FIGS. 6 and 7 is an exemplary jumper tube 72 connected to the cap outlet port 63 of the distributor cap 62. The first end 78 of the jumper tube 72 is welded into a counterbore 82 of an exemplary first spoolie 74. A spherical spoolie end 83 of the first spoolie 74 is press-fitted into a cylindrical portion 99 of a first sleeve 84 of the distributor cap 62. The first sleeve 84 is press-fitted into an outlet bore 86 of the distributor cap 62 as indicated by first and second press fits 88, 90 and retained therein with a retainer clip 91 in clip grooves 95 in the outlet bore 86.

Figure 8:
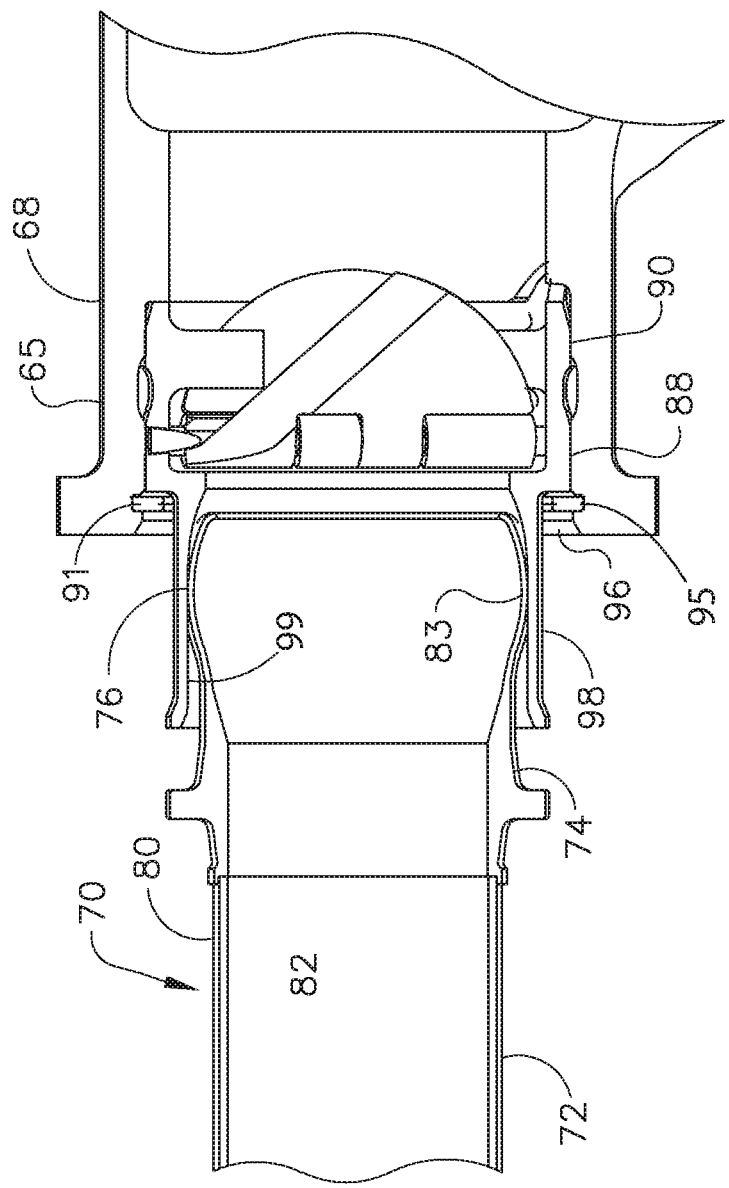
FIG. 8 is a cut-away perspective view illustration of the spoolie, jumper tube, and a port cap of the spoolie manifold illustrated in FIG. 5.

Referring to FIGS. 5 and 8, a spherical spoolie end 83 of the second spoolie 76 is connected to the exemplary port cap 68 in the same manner. A second end 80 of jumper tube 72 is welded into a counterbore 82 of an exemplary first spoolie 74. The spherical spoolie end 83 of the first spoolie 74 is press-fitted into a cylindrical portion 99 of a second sleeve 98 of an exemplary port cap 68. The second sleeve 98 is press-fitted into an inlet bore 96 of the port cap 68 as indicated by first and second press fits 88, 90 and retained therein with a retainer clip 91 in clip groove 95 in the outlet bore 86.

Figure 9:
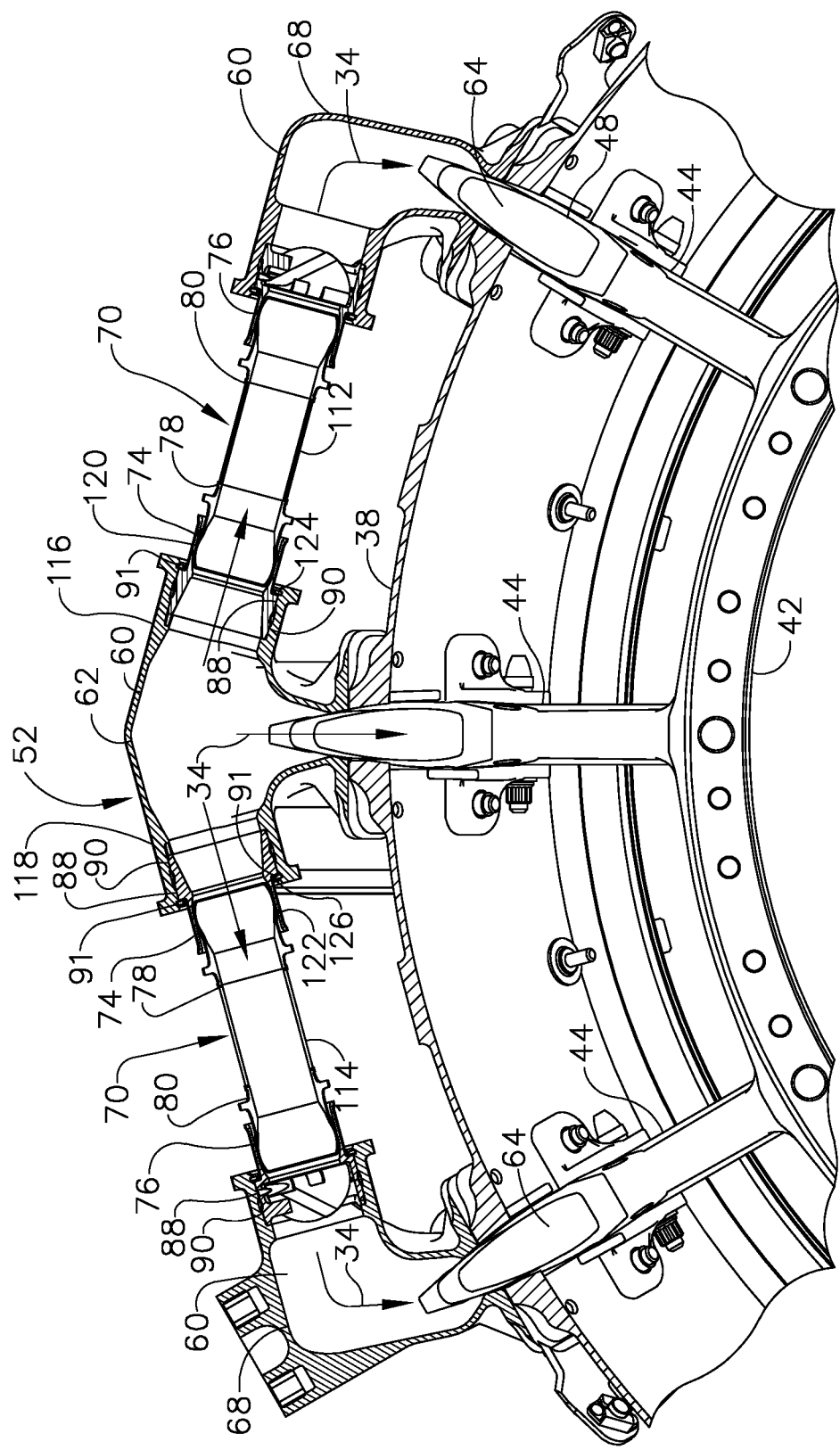
FIG. 9 is a partially cut-away forward looking aft perspective view illustration of the spoolie manifold illustrated in FIG. 4.

The exemplary embodiment of the spoolie manifold 52 illustrated in FIGS. 3-8 includes a distributor cap 62 having an inlet 66 connected to the bleed duct 32 which leads to a stage of the compressor such as the fourth stage. Referring to FIG. 9, the spoolie manifold 52 may be described as having clockwise and counter-clockwise extending jumper tubes 112, 114 connected to clockwise and counter-clockwise outlet ports 116, 118 respectively of the distributor cap 62. Each of the clockwise and counter-clockwise jumper tubes 112, 114 includes first and second spoolies 74, 76 attached to each of opposite distal first and second ends 78, 80 respectively of the clockwise and counter-clockwise jumper tubes 112, 114. Each of the clockwise and counter-clockwise jumper tubes 112, 114 includes a second end 80 welded into a counterbore 82 of the second spoolie 76. Spherical spoolie ends 83 of the second spoolies 76 are press-fitted into clockwise and counter-clockwise sleeves 120, 122 in clockwise and counter-clockwise outlet bores 124, 126 respectively in the distributor cap 62. The clockwise and counter-clockwise sleeves 120, 122 are press-fitted into the clockwise and counter-clockwise outlet bores 124, 126 as indicated by first and second press fits 88, 90 and retained therein with retainer clips 91.

While there have been described herein what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims.

What is claimed is:

1. A spoolie manifold comprising:
an annular turbine frame including an annular hub spaced radially inwardly from an annular casing,
a plurality of circumferentially spaced apart hollow struts having strut ports including casing ports in the casing,
the struts extending radially between a casing and the hub,
two or more spaced apart caps,
the caps including cap outlets in fluid supply communication with corresponding ones of casing ports in the casing,
each strut bolted to a support pad bolted to the casing and in flow communication with a respective strut port therein,
at least one pair of the caps connected together in flow communication by a jumper tube assembly, and
the jumper tube assembly including hollow and empty jumper tube having first and second spoolies attached to opposite distal first and second ends respectively of the jumper tube.

2. The A spoolie manifold comprising:
two or more spaced apart caps,
each of the caps including an outlet,
at least one of the connected together in flow communication by a jumper tube assembly,
the jumper tube assembly including a hollow and empty jumper tube having first and second spoolies attached to opposite distal first and second ends respectively of the jumper tube,
the first and second ends welded into counterbores of the first and second spoolies respectively,
spherical spoolie ends of the first and second spoolies press-fitted into cylindrical portions of first and second sleeves in bores in first and second ones of the at least one pair of the caps respectively, and
the first and second sleeves retained in the bores with retainer clips.

3. The spoolie manifold as claimed in claim 2, further comprising the first sleeve press-fitted into an outlet bore of the first one of the at least one pair of the caps and the second sleeve press-fitted into inlet bore in the second one of the at least one pair of the caps respectively.

4. The spoolie manifold as claimed in claim 3, further comprising an inlet of the first one of the at least one pair of the caps.

5. The spoolie manifold as claimed in claim 4, further comprising a duct connected in flow communication to the inlet.

6. The spoolie manifold as claimed in claim 1, further comprising:
the first and second ends welded into counterbores of the first and second spoolies respectively, and
spherical spoolie ends of the first and second spoolies press-fitted into cylindrical portions of first and second sleeves in bores in first and second ones the caps respectively.

7. A spoolie manifold comprising:
three spaced apart caps,
the three caps including a distributor cap spaced apart from and disposed, between two port caps,
each of the caps including an outlet,
each of the port caps connected in flow communication to the distributor cap by a jumper tube assembly,
the jumper tube assembly including a hollow and empty jumper tube having first and second spoolies attached to opposite distal first and second ends respectively of the jumper tube,
the first and second ends welded into counterbores of the first and second spoolies respectively,
spherical spoolie ends of the second spoolies press-fitted into cylindrical portions of second sleeves in inlet bores in the port caps,
spherical spoolie ends of the first spoolies press-fitted into cylindrical portions of first sleeves in outlet bores in the distributor cap, and
the first and second slaves retained in the outlet and inlet bores with retainer clips.

8. The spoolie manifold as claimed in claim 7, further comprising an inlet of the distributor cap.

9. The spoolie manifold as claimed in claim 8, further comprising a duct connected in flow communication to the inlet.

10. The spoolie manifold as claimed in claim 7, further comprising:
the port caps including clockwise and Counter-clockwise port caps connected in flow communication to the distributor cap by clockwise and counter-clockwise extending hollow and empty jumper tubes including the jumper tube connected to clockwise and counter-clockwise outlet ports respectively of the distributor cap, and
the first and second spoolies attached to each of the opposite distal first and second ends respectively of each of the clockwise and counter-clockwise jumper tubes.

11. The spoolie manifold as claimed in claim 10, further comprising:
the first and second ends welded into counterbores of the first and second spoolies respectively,
spherical spoolie ends of the second spoolies press-fitted into cylindrical portions of second sleeves in inlet bores in the port caps,
spherical spoolie ends of the first spoolies press-fitted into cylindrical portions of first sleeves in outlet bores in the distributor cap, and
the first and second sleeves retained in the outlet and inlet bores with retainer clips.

12. The spoolie manifold as claimed in claim 11, further comprising an inlet of the distributor cap.

13. The spoolie manifold as claimed in claim 12, further comprising a duct connected in flow communication to the inlet.

14. A gas turbine engine assembly comprising:
an annular outer casing circumscribing a centerline axis of the engine,
a spoolie manifold including three spaced apart caps with cap outlets in fluid supply communication with corresponding ones of casing ports in the annular outer casing,
the three cups including a distributor apart from and disposed between port caps,
each of the port caps connected in flow communication to the distributor cap by a jumper tube assembly,
the jumper tube assembly including a hollow and empty jumper tube having first and second spoolies attached to opposite distal first and second ends respectively of the jumper tube,
the first and second ends welded into counterbores of the first and second spoolies respectively, spherical spoolie ends of the second spoolies press-fitted into cylindrical portions of second sleeves in inlet bores in the port caps, spherical spoolie ends of the first spoolies press-fitted into cylindrical portions of first sleeves in outlet bores in the distributor cap, and the first and second sleeves retained in the outlet and inlet bores with retainer clips.

15. The assembly as claimed in claim 14, further comprising:

an annular turbine frame including an annular hub spaced radially inwardly from an annular casing, a plurality pf circumferentially spaced apart hollow struts having strut ports including casing ports in the casing, the struts extending radially between a casing and the hub, the caps including cap outlets in fluid supply communication with corresponding ones of casing ports in the casing, and each strut bolted to a support pad bolted to the casing and in flow communication with a respective strut port therein.

16. The assembly as claimed in claim 14, further comprising a bleed duct connected in fluid supply communication with an inlet of the distributor cap.

17. The assembly as claimed in claim 16, further comprising a high pressure compressor connected in fluid supply communication with the bleed duct.

18. The assembly as claimed in claim 14, further comprising:

an annular turbine frame including an annular hub spaced radially inwardly from the casing, a plurality of circumferentially spaced apart hollow struts having strut ports including the ports in the annular outer casing, and the struts extending radially between the and the nub.

19. The assembly as claimed in claim 14, further comprising a high pressure compressor connected in fluid supply communication with a bleed duct connected in fluid supply communication with an inlet of the distributor cap.

* * * * *